UNITED STATES PATENT OFFICE.

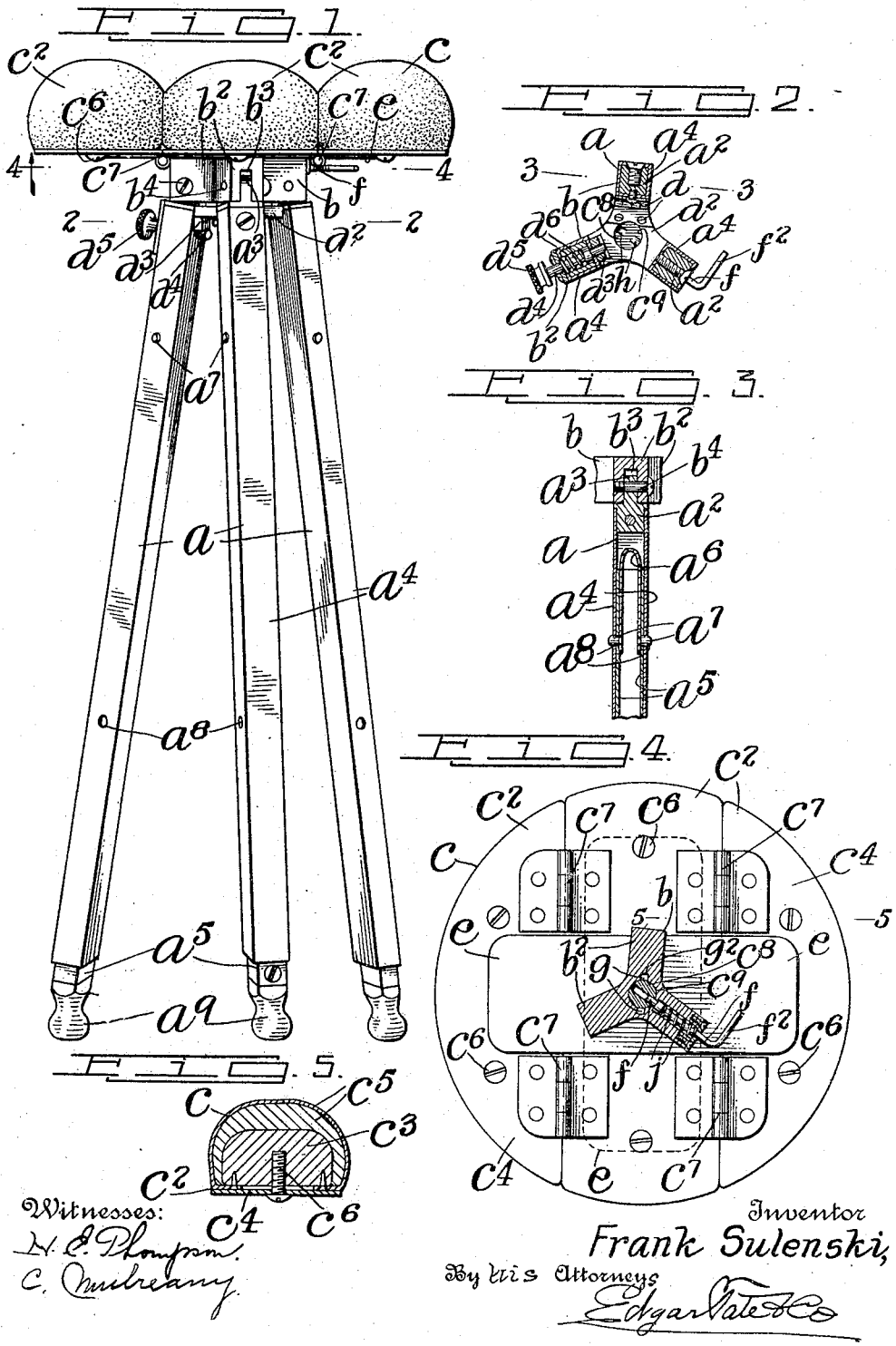

FRANK SULENSKI, OF BROOKLYN, NEW YORK.

STOOL.

1,205,057.  Specification of Letters Patent.  Patented Nov. 14, 1916.

Application filed April 2, 1915. Serial No. 18,707.

*To all whom it may concern:*

Be it known that I, FRANK SULENSKI, a citizen of the United States, and residing at Brooklyn, in the county of Kings and State of New York, have invented certain new and useful Improvements in Stools, of which the following is a specification, such as will enable those skilled in the art to which it appertains to make and use the same.

This invention relates to stools or seats of the class usually known as camp stools, and the object thereof is to provide an improved device of this class which is composed of separate detachably connected parts adapted to be compactly folded together so as to be conveniently packed in a small space for shipment, carriage or other purposes, and which may be quickly and easily set up for use whenever and wherever desired, and which will also be sufficiently strong to support any necessary weight and will not easily get out of order or frequently need repair.

The invention is fully disclosed in the following specification, of which the accompanying drawing forms a part, in which the separate parts of my improvement are designated by suitable reference characters in each of the views, and in which:—

Figure 1 is a perspective side view of my improved stool; Fig. 2 a partial section on the line 2—2 of Fig. 1; Fig. 3 a partial longitudinal section through one of the legs and on the line 3—3 of Fig. 2; Fig. 4 a section on the line 4—4 of Fig. 1; and, Fig. 5 a partial section on the line 5—5 of Fig. 4.

My improved stool is made in the form of a tripod and is composed of a plurality of legs $a$, preferably three in number, a head $b$ with which the legs $a$ are connected and a seat $c$ connected with the head $b$.

The head $b$ is approximately triangular in form, or comprises a central body portion having three equally spaced arms $b^2$ to which the legs $a$ are hinged as shown in Figs. 1 and 3. In this operation the arms $b^2$ are provided in their under sides and outer ends with slots $b^3$, and the legs $a$ with blocks $a^2$ having tongues $a^3$ which fit in said slots. Screws or bolts $b^4$ are passed through the arms $b^2$ and tongues $a^3$ for connecting the legs with the head $b$ and forming hinges on which said legs are free to swing radially.

The legs $a$ are composed of telescopic members $a^4$ and $a^5$ and the blocks $a^2$ are secured in the upper ends of the outer parts $a^4$ of said legs. Placed in the upper ends of the inner parts $a^5$ are loop-shaped or U-shaped springs $a^6$, the end portions of which are provided with plugs $a^7$ movable outwardly and inwardly through corresponding holes $a^8$ in both the inner and the outer parts $a^4$ and $a^5$ of said legs, while the lower ends of the parts $a^5$ of said legs are provided with knobs or heads $a^9$.

In the accompanying drawing, Figs. 1 and 3, the legs $a$ are telescoped to their fullest extent and the plugs $a^7$ are operating in the upper holes $a^8$, and by forcing said plugs inwardly by means of the thumb and finger the parts $a^5$ of the legs may be drawn out until said plugs will operate in the lower holes $a^8$. Said legs will then be extended or lengthened to the fullest extent. It will be understood that the part $a^4$ of the legs may be provided with any preferred number of the holes $a^8$ and the height of the stool may thus be regulated to any desired extent.

Beneath the head $b$ and hinged to one of the legs $a$ as shown at $d$ is a lock block $d^2$ which is approximately triangular in form, or provided with three projecting members corresponding with the legs $a$, one of which is provided with a downwardly directed lug $d^3$. When the stool is in position for use, as shown in Fig. 1, the lock block $d^2$ is raised into the position shown in said figure, and operates to lock or hold the legs in operative position by a spring controlled pin $d^4$ passing through the top portion of one of the legs $a$ and provided at its outer end with a milled head $d^5$. Within the said leg is a spiral spring $d^6$ which normally forces the pin $d^4$ inwardly into operative position so as to secure the lock block $d^2$ in operative position, and when it is desired to fold the legs $a$ together the pin $d^4$ is drawn outwardly and the lock block $d^2$ dropped downwardly between said legs.

The seat $c$ is preferably circular in form and consists of three parts $c^2$, each of which is composed of a central block member $c^3$ and a bottom plate $c^4$, the central block member $c^3$ being upholstered as shown at $c^5$, in the form of construction shown, and the bottom plate member being secured to the central block member by screws $c^6$. The separate parts $c^2$ of the seat are hinged together as shown at $c^7$, and the bottom plate $c^4$ of the central part of the seat is provided with a central pin $c^8$ on which is mounted an oblong lock plate $e$ which is rotatable on said pin, and the pin $c^8$ is adapted to enter a corresponding central socket or recess $c^9$ in the head $b$. A spring controlled lock pin $f$ is mounted in one of the arms $b^2$ of the head $b$ for locking the seat to said head, and said lock pin is provided at its outer end with a handle $f^2$ and the inner end thereof enters the central pin $c^8$ of the seat as shown in said figure. In this position of the parts the seat is locked to the head; but whenever desired the pin $f$ may be drawn outwardly and the seat detached from the head $b$, as will be readily understood, and the separate parts of the seat may be folded up, or folded together, but in this operation the plate $e$ must be turned around into the position shown in dotted lines in Fig. 4.

In order to operate the plate $e$, as above described and as shown in Fig. 4, said plate must be longitudinally movable on the pin $c^8$ to a slight extent, and said pin is provided on its opposite sides with stops or lugs $g$ to limit the movement of said plate thereon. The head $b$ is provided on the opposite sides of the central socket or recess $c^9$ with recesses $g^2$ to receive said stops or lugs $g$ when the seat is attached to the head $b$. The end of the lock pin $c^8$ is also provided in its opposite sides with beveled recesses $h$ to receive the inner end of the lock pin $f$, when the seat is forced downwardly into position, whereby the lock pin $f$ is forced outwardly by the operation of forcing the seat downwardly in position, and then inwardly by the spring $j$ which operates the lock pin $f$ in one direction.

When the seat $c$, or its separate parts are made thick, as shown in Figs. 1 and 5, they cannot be compactly folded together, but my invention is not limited to the construction of the seat, or the separate parts thereof as herein shown and described, and said separate parts may be made thin and of any suitable material and the hinges so formed that when the seat is detached from the head, the separate parts thereof may be compactly folded together. With my improvement the legs $a$, or the separate parts thereof, may be telescoped into the shortest possible space and folded compactly together, and the seat may be detached from the head and its separate parts folded compactly together, and in this way the entire device may be carried in a small package, or in a handbag.

In order to insure the operation of the parts of the telescopic legs as herein shown and described and of the locking springs $a^6$ therein, said legs or the separate parts thereof must be rectangular in form in cross section, or of such form as to prevent the rotation of the inner parts in the outer parts.

While I have shown and described the preferred details of the various parts of my improved stool, my invention is not limited thereto, and changes therein and modifications thereof may be made, within the scope of the appended claims, without departing from the spirit of my invention or sacrificing its advantages.

Having fully described my invention, what I claim as new and desire to secure by Letters Patent is—

1. In a stool of the class described, a head and a detachable seat connected therewith, said seat being composed of a central part and side portions hinged thereto, and the central part being provided with a projecting pin by which it is connected with the head and on which is mounted a lock plate which is movable longitudinally of said pin and rotatable thereon.

2. In a stool of the class described, a head, a detachable seat connected therewith, legs pivoted to said head, said seat being provided with a projecting pin by which it is connected with said head, a lock device hinged to one of said legs and adapted to hold said legs in their operative position, and spring-controlled means connected with one of the other of said legs for supporting said lock device in its operative position.

In testimony that I claim the foregoing as my invention I have signed my name, in presence of the subscribing witnesses, this 1st day of April, 1915.

FRANK SULENSKI.

Witnesses:
  C. MULREANY,
  H. E. THOMPSON.

Copies of this patent may be obtained for five cents each, by addressing the "Commissioner of Patents, Washington, D. C."